United States Patent
Argy et al.

(12) 
(10) Patent No.: US 6,346,557 B1
(45) Date of Patent: Feb. 12, 2002

(54) POROUS MATERIAL, METHOD FOR MAKING SAME AND APPLICATIONS

(75) Inventors: Gilles Argy, La Queue les Yvelines; André Cheymol, Dangé Saint Romain; Nicolas Garois, Amilly; Jean Terrisse, Strasbourg, all of (FR)

(73) Assignee: Hutchinson S.A., Paris (FR)

( * ) Notice: Subject to any disclaimer, the term of this patent is extended or adjusted under 35 U.S.C. 154(b) by 0 days.

(21) Appl. No.: 09/485,955

(22) PCT Filed: Aug. 19, 1998

(86) PCT No.: PCT/FR98/01821

§ 371 Date: Apr. 12, 2000

§ 102(e) Date: Apr. 12, 2000

(87) PCT Pub. No.: WO99/09877

PCT Pub. Date: Mar. 4, 1999

(30) Foreign Application Priority Data

Aug. 21, 1997 (FR) .......................................... 97 10532

(51) Int. Cl.⁷ .................................................. C08J 9/30
(52) U.S. Cl. ............................ 521/71; 521/65; 521/68
(58) Field of Search ............................... 521/65, 71, 68

(56) References Cited

U.S. PATENT DOCUMENTS

| | | | |
|---|---|---|---|
| 2,832,997 A | * 5/1958 | Bristol | .................... 521/68 |
| 4,104,435 A | 8/1978 | Ballesteros | |
| 4,447,560 A | * 5/1984 | Piersol | .................... 521/68 |
| 4,559,243 A | 12/1985 | Pässler et al. | |
| 4,940,631 A | 7/1990 | Colin et al. | |
| 6,207,738 B1 | * 3/2001 | Zuckerman et al. | .......... 521/71 |

FOREIGN PATENT DOCUMENTS

| | | |
|---|---|---|
| EP | 418151 | 3/1991 |
| FR | 2748277 | 11/1997 |
| GB | 581711 | 10/1946 |

* cited by examiner

*Primary Examiner*—Morton Foelak
(74) *Attorney, Agent, or Firm*—Alston & Bird LLP

(57) ABSTRACT

The invention concerns a porous material, a method for making same and its applications. Said porous material comprises a mixture of cellulose fibres and at least an elastomer and is characterised in that it has a honeycomb structure having cells with a size ranging between 0.1 and 10 mm, a density of the order of 0.03 to 0.1, water absorbing capacity not less than 750%, and water holding capacity after manual wringing less than 100%. The invention is applicable for making in particular sponges and household goods comprising a spongy element such as brushes and squeegees for cleaning surfaces.

19 Claims, No Drawings

POROUS MATERIAL, METHOD FOR MAKING SAME AND APPLICATIONS

The present invention relates to a spongy material, to a process for preparing it and to its applications, especially for the manufacture of household sponges and articles which include a spongy element, such as sponge cloths, squeezy mops and squeegees for cleaning surfaces.

In the household cleaning field, the sponges mainly used are plant-derived sponges, based on regenerated cellulose, and synthetic sponges which usually consist of polyurethane open-cell foams.

Although sponges based on regenerated cellulose have, as a general rule, very satisfactory properties, both in terms of water absorption and water retention capacities, ability to be wrung out, flexibility, toughness, mechanical strength and resistance to water, detergents and heat, their manufacture causes, however, major problems.

This is because these sponges are manufactured by processes which consist in firstly converting cellulose into a viscose pulp, which conversion is carried out by treating the cellulose with sodium hydroxide, dissolving the alkali cellulose thus formed in carbon disulphide and treating the resulting cellulose xanthate in sodium hydroxide. Next, after incorporating reinforcing fibres (hemp, flax, cotton, etc.), dyes and sodium sulphate crystals into the viscose pulp thus obtained and after forming by moulding or extrusion, the compound is heated, which makes it possible for the viscose to solidify and cellulose to be regenerated therefrom by evaporation of the carbon disulphide and causing the sodium sulphate crystals to melt which, by removing them, leave in their place a multitude of cells.

Thus, the implementation of these processes on an industrial scale, given the very corrosive and toxic nature of the products that they use, requires very specific plants which are very expensive both in terms of investment and of operating costs, is highly polluting despite the decontamination equipment that these plants include and the measures that are taken to limit the deleterious effect on the environment, and has relatively low production yields.

Polyurethane-foam sponges are obtained by markedly less constrictive manufacturing processes which are based on a condensation reaction between a polyol and a polyisocyanate in an aqueous phase, but they do have the drawback of being of a relatively hydrophobic nature which results in wettability, water-retention and wringing properties which are inadequate, despite the many treatments that have been proposed in the prior art for making polyurethane foams more hydrophilic.

Moreover, it has been proposed in U.S. Pat. No. 4,559,243 to produce spongy structures in the form of sheets a few mm in thickness by depositing, onto a support such as a woven, a nonwoven or a plastic sheet, a foam made of a mixture of a latex and of hydrophilic fibres, of the type comprising cellulose, viscose or even polyvinyl alcohol fibres, and then subjecting the compound to heating operations so as to coagulate the foam and to stabilize it into an open-cell structure by drying and crosslinking. Although the manufacture of these spongy structures, such as polyurethane-foam sponges, is free of the drawbacks of the processes for manufacturing plant-derived sponges, it proves to be the case, however, that these structures have a low absorbency which considerably limits their importance.

Consequently, the Applicant was set the task of providing sponges which have all the qualities required for household use and, especially, the ability to absorb a large volume of water and to retain the water thus absorbed for as long as it is desired not to actively expel it, the ability, however, to release this water under the effect of manual wringing and a high wipeability, the manufacturing of which sponges is simple to implement, requires no major industrial investment, uses neither corrosive substances nor toxic substances, is environmentally friendly and is characterized by economically advantageous productivity levels.

This objective is achieved, according to the present invention, by a spongy material comprising a mixture of cellulose fibres and of at least one elastomer, characterized in that it has:

a cellular structure formed by cells whose size is between 0.01 and 10 mm;

a relative density of between 0.03 and 0.1;

a water absorption capacity of at least 750%; and a water retention capacity, after manual wringing, of less than 100%.

In the context of the present invention, the expression "water absorption capacity" should be understood to mean the ratio, expressed as a percentage, of the mass of water capable of being absorbed by the spongy material when it is entirely immersed in a volume of water to the dry mass of this spongy material and the expression "water retention capacity after manual wringing" should be understood to mean the ratio, also expressed as a percentage, of the mass of water retained in the spongy material after it has been manually wrung to the dry mass of the said spongy material.

The useful cellulose fibres according to the invention are all natural cellulose fibres such as wood cellulose fibres or papermaking fibres (coniferous or deciduous wood fibres, bleached or unbleached), cotton, flax, hemp, jute or sisal fibres or else regenerated fibres from rags.

They may, moreover, be long fibres (that is to say fibres more than 1 cm in length), short fibres (having a length of less than 3 mm) or fibres of intermediate length (between 3 mm and 1 cm in length) or else they may be composed of a mixture of fibres of various lengths. Thus, for example, excellent results have been obtained by using either long cellulose fibres, prepared by cutting sheets of cotton linters into shreds having a size of a few cm, by themselves or in combination with short cellulose fibres such as those sold under the brand name ARBOCELL® by Rettenmaier & Söhne and which measure about 900 $\mu$m in length, or cellulose fibres of intermediate length, which are also prepared by cutting sheets of cotton linters, but into shreds having a length of between approximately 8 mm and 1 cm.

Moreover, whatever their length, the cellulose fibres that can be used in the invention may advantageously have been subjected beforehand to a treatment suitable for promoting their entanglement within the elastomer and, consequently, their adhesion to this elastomer. Such a treatment may consist, for example, of a fibrillation treatment, that is to say mechanical agitation which has the effect of freeing the fibrils on the surface of the fibres, allowing them to catch on each other, or of an exposure to ultraviolet radiation which, by causing reactive sites to be formed on the surface of the fibres, allows chemical bonding of these fibres. By way of example of commercially available cellulose fibres that have undergone fibrillation, mention may be made of the fibres sold under the brand name LYOCELL® by Courtaulds Chemicals.

As regards the useful elastomer according to the invention, this may be chosen from very many elastomers as long as these elastomers are compatible with cellulose and therefore do not have a pronounced hydrophobicity.

Thus, the elastomer will advantageously be selected from polybutadiene rubbers, butadiene-styrene copolymers, butadiene-acrylonitrile copolymers (or nitrile rubbers), ethylene-propylene copolymers and terpolymers, styrene-butadiene or styrene-isoprene block copolymers, styrene-ethylene-butylene-styrene block copolymers, thermoplastic elastomers derived from polyolefins (such as SANTO-PRENE® from AES or VEGAPRENE® from Hutchinson), octene-ethylene copolymers (such as those sold by DuPont-Dow under the brand name ENGAGE®), copolymers of ethyl acrylate and other acrylates, such as acrylate-ethylene-acrylic acid terpolymers (such as those sold by DuPont de Nemours and Exxon under the references VAMAC® and ATX® 325, respectively) or acrylate-acrylonitrile-styrene terpolymers (such as SUNIGUM® from Goodyear), polychloroprenes, chlorinated polyethylenes, and mixtures thereof.

Moreover, with regard to the aforementioned polyolefin elastomers, and especially polybutadiene, butadiene-styrene and butadiene-acrylonitrile rubbers, the use of carboxylated derivatives of these elastomers has proved to be particularly advantageous because of their ability to form, by ionic bridges between the carboxyl functional groups in the presence of divalent or trivalent metals, such as zinc, calcium or aluminium, a network which plays a part in giving the spongy material satisfactory cohesion.

According to the invention, the spongy material may include, in addition to the cellulose fibres, synthetic fibres suitable for acting as a reinforcement within the elastomer and making it possible either to further increase the cohesion of the spongy material, and consequently its mechanical strength when this proves to be necessary, or to reduce the amount of elastomer needed for obtaining suitable cohesion and thus reduce the manufacturing cost of the said material.

By way of examples of suitable synthetic fibres, mention may be made of polyamide fibres, polyester fibres, polyethylene fibres, polypropylene fibres, polyacrylonitrile fibres and polyvinyl alcohol fibres, it being understood that, whatever the chemical nature of the fibres chosen, it will be preferred to use fibres having both sufficient tenacity, so that they can fulfill their role as reinforcing fibres, and sufficient flexibility to prevent them from stiffening the spongy material finally obtained. In whatever situation, when such reinforcing fibres are present in the spongy material they advantageously represent at most 20%, and preferably between 5 and 15%, by mass of the total mass of the fibres present in this material.

The spongy material according to the invention may also advantageously comprise one or more polymers suitable for being used as agents acting as an interface between the cellulose fibres (and, optionally, the synthetic fibres) and the elastomer, and thus for promoting their mutual adhesion. To do this, this or these polymers will preferably have a more hydrophilic nature than the elastomer.

By way of examples of polymers that can be used, mention may be made of polyvinyl alcohols (ELVANOL® from DuPont de Nemours, GOHSENOL® from Nippon Goshei, etc.), melamine-formaldehyde resins (CYREZ 963 E from Cytec, RESIMENE s 3521 from MONSANTO, etc.), vinyl adhesives or wood adhesives, or else polyurethanes. When such polymers are present in the spongy material, they may represent up to 35 parts by mass per 100 parts by mass of the elastomer.

The spongy material may, in addition, include one or more additives suitably chosen, depending on the properties that it is desired to give it, from the additives conventionally employed in the polymer industry. Thus, it may contain light-coloured fillers of the silica, carbonate, clay, chalk or kaolin type, plasticizers, dyes or pigments, stabilizers such as antioxidants, UV stabilizers, antiozonants, fungicides, bactericides, microencapsulated fragrances, as well as processing aids suitable for facilitating its manufacture, such as thickeners, surfactants, latex coagulants or crosslinking agents, as will be explained below.

According to a first preferred embodiment of the spongy material according to the invention, the ratio of the total mass of the fibres (cellulose fibres and, optionally, synthetic fibres) to the mass of elastomer which are present in this material is between 2 and 0.2 and preferably between 1.5 and 0.3.

According to the invention, the spongy material may have cells all of the same size or approximately of the same size. However, it is preferred for the size of these cells to be heterogeneous and to be distributed over a wide distribution so as to form a network of microcavities and of macrocavities within the spongy material, which network is capable of increasing the water absorption capacity of this material as well as its water retention capacity before wringing (so that the water does not drip out of it due to the effect of gravity) and to give it, in addition, the flexibility needed for allowing it to be easily wrung out.

According to another preferred embodiment of the spongy material according to the invention, it has a relative density of between 0.03 and 0.08 and a water absorption capacity of between 900 and 1200%.

According to yet another advantageous embodiment of the spongy material according to the invention, it has, in addition, a tensile strength of at least 0.1 MPa.

Thus, the spongy material according to the invention has many advantages: in addition to having a high absorbency, it is capable of retaining the absorbed water for as long as it is desired not to actively extract it therefrom, while still releasing it under the effect of manual wringing. Moreover, it has a high wipeability. In addition, it is flexible, making it easy to handle it, and is resilient, allowing it to resume its initial shape after each wiping operation. Furthermore, it has mechanical properties, especially tensile strength properties, which are extremely satisfactory.

The spongy material according to the invention is consequently particularly well suited to be used in the construction of sponges, and especially toilet sponges and sponges for cleaning surfaces. To do this, it preferably has a thickness of between 1 and 15 cm, particularly preferably between 1.5 and 10 cm and even more preferably between 2 and 5 cm in order to make it easier to handle these sponges.

The subject of the present invention is also a process for preparing a spongy material as defined above which is characterized in that it comprises:
 a) preparing a mixture comprising at least cellulose fibres and an elastomer;
 b) forming this mixture;
 c) incorporating into the mixture, during step a) or step b), an agent capable of conferring, possibly via a change of physical state, a cellular structure on the product obtained at step b) and, if necessary;
 d) applying, to the product obtained at step b), a treatment capable of causing the change of physical state of the said agent and/or the crosslinking of the said product.

According to a first preferred method of implementing the process according to the invention, the elastomer is a crosslinkable elastomer which is used in the form of a latex and the process comprises:
 a) dispersing the cellulose fibres in an aqueous phase, mixing this dispersion with the latex in the presence of a suitably chosen crosslinking system and incorporating pieces of ice into the resulting mixture;

b) forming this mixture by freezing; and c) heating the product resulting from the freezing in order to melt the pieces of ice that it contains, crosslinking it and drying it.

Thus, in this first preferred method of implementing the process according to the invention, the agent capable of conferring a cellular structure on the spongy material consists of pieces of ice which, by being incorporated into the cellulose-fibre dispersion/latex mixture prior to it being frozen, will form, while this mixture is being frozen and consequently coagulated, the locations of the cells by the position that they occupy within the said mixture. The subsequent heating of the product after the freezing operation, which simultaneously melts the pieces of ice that it contains and crosslinks and dries this product, makes it possible to form a cellular structure.

In fact, the shape and size of the pieces of ice used determine those of the cells of the spongy material. Also, these pieces of ice are chosen depending on the cellular structure that it is desired to give the spongy material. Thus, it is possible to use, depending on the case, pieces of ice of irregular shape, such as crushed ice, obtained for example by grinding or crushing, or, on the contrary, pieces of ice of regular shape, such as spherical or ovoid pieces of ice, obtained by moulding, granulation or any other process, or else mixtures of such pieces. Moreover, although it is generally preferred to use a mixture of pieces of ice having different sizes in order to obtain a spongy material with a wide distribution of cell sizes, it is also possible to use pieces of ice having the same or approximately the same size if it is desired for the cells of the spongy material to be all approximately of the same size.

According to an advantageous way of carrying out this first preferred method of implementation, the pieces of ice which are incorporated into the cellulose-fibre dispersion/latex mixture are composed of a mixture of approximately spherical pieces of ice having diameters ranging between 0.1 and 10 mm.

The ratio of the mass of dry matter present in the cellulose-fibre dispersion/latex mixture to the mass of pieces of ice incorporated into this mixture determines the final density of the spongy material. It is therefore advantageously chosen according to the density that it is desired to give the spongy material.

Thus, by way of example, excellent results have been obtained by preparing, in accordance with this first preferred method of implementation, spongy materials having a ratio of the dry mass of cellulose fibres to that of the elastomer close to 1:

by mixing a dispersion of cellulose fibres having a fibre concentration of approximately 10% with a latex having a dry elastomer content of approximately 42% in proportions making it possible to obtain, taking into account the additives that are added to them (crosslinking system and, optionally, coagulants, fillers, dyes, etc.), a ratio of the mass of dry matter to the mass of water which are present in this mixture of about 0.2 before the pieces of ice are incorporated; and by incorporating, into the said mixture, pieces of ice in an amount suitable for lowering the ratio of the mass of dry matter to the mass of water (including the water represented by the pieces of ice) which are present in this mixture to a value of about 0.1.

The cellulose fibres may be dispersed in the aqueous phase by introducing these fibres into a mixer prefilled with a suitably chosen volume of water and subjected to suitable mechanical stirring (which, in general, will be more vigorous the longer the cellulose fibres) and by maintaining this stirring until a homogeneous pulp is obtained. Whatever the type of mixer (turbodisperser, planetary mixer, stirrer fitted with a deflocculating blade, etc.) in which this dispersion is made, it is advantageous for this mixer to be equipped with a system preventing, or at the very least limiting, the heat-up of the dispersion, such as, for example, a system for chilling the walls.

According to another advantageous way of carrying out this first preferred method of implementation, the cellulose-fibre dispersion/latex mixture, after the pieces of ice have been incorporated, is frozen by cooling this mixture to a temperature of between −10 and −40° C. and keeping it at this temperature for a time of between 2 and 5 hours, depending on its thickness. However, it is possible to use lower temperatures, for example of about −50 to −60° C.

The product after freezing is heated by preferably subjecting the said product to a temperature of between 100 and 200° C. by means of a heating device such as a microwave or infrared tunnel, a steam tube, a live-steam or hot-air autoclave, a forced-air or hot-air oven or a high-frequency oven, or else by using several of these devices in succession.

It should be pointed out that, if it is desired for the spongy material to contain, in addition to the cellulose fibres, synthetic fibres, it is quite possible, in accordance with this first preferred method of implementation, to add these synthetic fibres to the cellulose fibres, for example by dispersing them jointly with the latter in the aqueous phase.

Similarly, if it is desired to use one or more polymers suitable for being used as agents acting as an interface between the fibres and the elastomer and/or one or more additives and, in particular, an agent suitable for promoting the coagulation of the latex during the freezing step (calcium chloride, ammonium chloride, calcium nitrate, etc.), these may be incorporated either into the cellulose-fibre dispersion or into the latex, or else into their mixture as obtained in step a).

According to a second preferred method of implementing the process according to the invention, the elastomer is a crosslinkable elastomer which is used in the form of a latex and the process comprises:

a) dispersing the cellulose fibres in an aqueous phase, mixing this dispersion with the latex in the presence of a suitably chosen crosslinking system and converting the resulting mixture into a foam;

b) forming this foam by coagulation; and c) heating the product resulting from this coagulation in order to crosslink it and dry it.

Thus, in this second preferred method of implementing the process according to the invention, the agent capable of conferring a cellular structure on the spongy material consists of a gas which, being introduced into the cellulose-fibre dispersion/latex mixture, will generate a multitude of bubbles within this mixture and convert it into a foam. The subsequent coagulation of this foam, by causing it to solidify while still maintaining the bubbles that it contains, results in the formation of an interconnected cellular structure advantageously characterized by a wide distribution of cell sizes.

Preferably, the gas is air and it is introduced into the cellulose-fibre dispersion/latex mixture by subjecting this mixture for a few minutes to vigorous mechanical stirring, advantageously at between 800 and 1200 rpm, for example in a turbodisperser which, here again, may be provided with a system suitable for preventing, or at the very least limiting, the heat-up of the mixture, such as a system for chilling the walls. However, it is possible to use a gas other than air, for example an inert gas, in order to carry out this foaming operation.

Insofar as the speed at which the cellulose-fibre dispersion/latex mixture is mechanically stirred and the duration of this stirring control both the density and size of the cells of the spongy material finally obtained, that is to say this density and size will both decrease the more vigorous and longer the stirring, the speed and duration of this stirring will therefore advantageously be chosen according to the properties that it is desired to confer on the spongy material.

According to a first alternative version of this second preferred method of implementation, the coagulation of the foam is obtained by freezing it. Advantageously, the freezing is carried out by cooling the foam to a temperature of between −10 and −30° C. and keeping it at this temperature for a time of between 2 and 5 hours, depending on its thickness.

According to another alternative version of this second preferred method of implementation, the foam is coagulated by thermally sensitizing the latex that it contains. Such a thermal sensitizing operation requires the presence in this foam of a coagulant capable of reacting under the effect of an increase in the temperature of the foam—that is to say in practice when the latter is heated—such as an organosiloxane. This coagulant is added to the latex in proportions, preferably, of between 0.05 and 0.5 parts by mass per 100 parts of dry mass of the elastomer present in this latex.

Advantageously, the latex is coagulated by a thermal sensitizing operation by taking the foam to a temperature of at least 25° C., and preferably greater than 35° C., for example in a microwave or infrared tunnel, a steam tube, a live-steam or hot-air autoclave, a forced-air or hot-air oven or a high-frequency oven and by keeping this foam at this temperature for a time long enough to cause it to gel, i.e. in practice for a time of between 1 and 5 hours depending on the thickness of the foam, the nature of the latex and of the coagulant, and the amount of coagulant used.

According to the invention, the coagulation, whether carried out by freezing or by thermal sensitizing, is followed by an operation in which the product resulting from this coagulation is heated, which operation is intended, in the first case, to thaw, dry and crosslink this product, in the second case, its action is limited to drying and crosslinking it. This heating operation is carried out by preferably subjecting the said product to a temperature of between 100 and 200° C., here again using a heating device of the type comprising a microwave or infrared tunnel, a steam tube, a live-steam or hot-air autoclave, a forced-air or hot-air oven or a high-frequency oven, or several of these devices in succession, and, by maintaining this temperature for a time of between 1 and 5 hours, depending on the case.

In practice, if the foam is coagulated by thermally sensitizing the latex, it is possible and even advantageous to carry out this coagulation and the drying and crosslinking of the resulting product in a single step and in a single heating device, by placing the foam directly in this device preheated to the chosen temperature for the drying and crosslinking, the coagulation then taking place during the rise in temperature of the foam.

According to this second preferred method of implementing the process according to the invention, it comprises, in addition, the incorporation, into the cellulose-fibre dispersion, the latex or the mixture thereof, depending on the case:

of a surfactant suitable for promoting the conversion of the cellulose-fibre dispersion/latex mixture into a foam; by way of examples of surfactants which have proved to be particularly useful in implementing the process according to the invention, mention may be made of sulphosuccinates such as those sold by Cytec under the brand name AEROSOL®; when such a surfactant is used, it is preferably added to the latex before the latter is mixed with the cellulose-fibre dispersion and in proportions of between 2 and 6 parts by mass per 100 parts of dry mass of the elastomer present in this latex;

of an agent suitable for stabilizing the foam, once the latter has formed; such an agent may especially be a thickener such as a cellulose ester or ether (hydroxyethylcellulose, hydroxypropylmethylcellulose, etc.); moreover, this agent is advantageously incorporated into the cellulose-fibre dispersion in proportions of between 0.5 and 4 parts by mass of dry mass [sic] of the elastomer present in the latex;

of an agent suitable for promoting the coagulation of the foam when this coagulation is obtained by freezing, of the calcium chloride, ammonium chloride or calcium nitrate type.

By way of example, excellent results have been obtained by preparing, according to this second preferred method of implementation, spongy materials having a ratio of the dry mass of cellulose fibres to the dry mass of the elastomer of close to 0.5 by mixing a cellulose-fibre dispersion having a fibre concentration of between 8 and 15% with a latex having a dry elastomer content of approximately 55% in proportions making it possible to obtain, taking into account the additives that are added to them (crosslinking system and, optionally, fillers, surfactants, thickeners, coagulants, etc.), a ratio of the mass of dry matter to the mass of water which are present in this mixture of about 0.3.

In this second preferred method of implementing the process according to the invention, it goes without saying that the cellulose fibres may be dispersed in the aqueous phase under the same conditions as those previously described in relation to the first preferred method of implementation.

Moreover, it is also possible, according to this second preferred method of implementation, to add synthetic fibres to the cellulose fibres, for example by dispersing them jointly with the latter in the aqueous phase and, if it is desired to use one or more polymers capable of being used as agents acting as an interface between the fibres and the elastomer and/or one or more additives other than those specifically envisaged above, to incorporate these elements either into the cellulose-fibre dispersion or into the latex or else into their mixture as obtained at step a).

According to a third preferred method of implementing the process according to the invention, the elastomer is a crosslinkable elastomer or a thermoplastic elastomer which is used in dry form and the process comprises:

a) mixing the cellulose fibres with the elastomer, optionally in the presence of a suitably chosen crosslinking system, and incorporating one or more blowing agents into this mixture;

b) forming the mixture by extrusion, calendering and/or moulding and, if necessary;

c) heating the product thus formed in order to decompose the blowing agent or agents that it contains, to expand it and, optionally, to crosslink it.

In the context of the present invention, the expression "blowing agent" should be understood to mean any agent which, by decomposing due to the effect of the temperature, is capable of releasing gas and consequently of causing the material in which it is found to expand.

Thus, in this third preferred method of implementing the process according to the invention, the agent capable of conferring a cellular structure on the spongy material consists of at least one blowing agent which is incorporated into the cellulose-fibre/elastomer mixture before the latter is formed and which, by decomposing, either during the forming of the mixture or after this forming, makes it possible for the resulting product to be expanded and thus a cellular structure to be formed in this product.

Preferably, several blowing agents having different decomposition kinetics are incorporated into the cellulose-fibre/elastomer mixture in order to obtain a spongy material having a wide distribution of cell sizes. However, it is possible to use only a single blowing agent when it is desired for the cells of the spongy material to be all approximately of the same size.

The useful blowing agents according to the invention may especially be chosen from azo-dicarbonamide, azodiisobutyronitrile, p,p'-oxybis-(benzenesulphonylhydrazide), p-toluenesulphonyl semi-carbazide and p-toluenesulphonyl hydrazide.

When the elastomer is a crosslinkable elastomer, it is moreover advantageous to adjust the expansion and crosslinking kinetics of the product after the forming operation, by varying the nature and the amount of crosslinking agents and blowing agents, so that the expansion is a maximum when the crosslinking is itself a maximum, thereby allowing this product to be stabilized while it is in its state of maximum expansion.

According to a first alternative version of this third preferred method of implementation, with the elastomer being a crosslinkable elastomer, the cellulose-fibre/elastomer mixture is formed by extrusion at a temperature of between 60 and 80° C. and then the extruded product is heated to a temperature of between 120 and 180° C., directly on leaving the extruder, for example by passing it through a microwave tunnel or a steam tube, in order to expand it and crosslink it.

According to another alternative version of this third preferred method of implementation, with the elastomer being a thermoplastic elastomer, the cellulose-fibre/elastomer mixture is formed by extrusion at a temperature of between 140 and 180° C. and the extruded product spontaneously expands as it leaves the die.

According to yet another alternative version of this third preferred method of implementation, with the elastomer being a crosslinkable elastomer, the cellulose-fibre/elastomer mixture is formed by calendering followed by compression moulding, which is carried out at a temperature of between 120 and 150° C. and allows the moulded product to be partially crosslinked. After demoulding, this product is heated to a temperature of between 150 and 200° C., for example by means of an oven or a hot-air autoclave, in order to expand it and complete its crosslinking.

According to yet another alternative version of this third preferred method of implementation, which applies both in the case in which the elastomer is a crosslinkable elastomer and in the case in which it is a thermoplastic elastomer, the cellulose-fibre/elastomer mixture is formed by partially filling an injection mould or transfer mould and then by expanding the said mixture and, optionally, simultaneously crosslinking it within the mould in order to completely fill the latter. When the elastomer is a crosslinkable elastomer, the mould is preheated, for example to a temperature of between 150 and 200° C.

According to a fourth preferred method of implementing the process according to the invention, the elastomer is a thermoplastic elastomer which is used in a dry form and the process comprises:

a) mixing the cellulose fibres with the elastomer; and
b) forming the mixture by extrusion and incorporating an expansion agent into this mixture while it is being formed.

According to a first alternative version of this fourth preferred method of implementation, the expansion agent is water or a gas such as propane or Freon, which is introduced into the extruder while the cellulose-fibre/elastomer mixture is being plasticized and the extruded product expands spontaneously as it leaves the die by the vaporization of the water or the gas that it contains.

This is made possible, for example, by applying temperature and pressure conditions at the die exit which are suitable for creating thermodynamic disequilibrium and, consequently, causing the water or gas contained in the extruded product to pass from a liquid state to a gaseous state.

According to another alternative version of this third preferred method of implementation, the expansion agent consists of one or more blowing agents which are introduced into the extruder while it is being fed with the cellulose-fibre/elastomer mixture and the extruded product expands spontaneously as it leaves the die.

In all cases, the extrusion is advantageously carried out at a temperature of between 140 and 190° C.

Whatever the method of implementing the process according to the invention, this process includes, whenever a crosslinkable elastomer is used, the incorporation of a crosslinking system, which is suitably chosen depending on this elastomer and may include, apart from an actual crosslinking agent (sulphur or peroxides), crosslinking promoters and accelerators, during preparation of the cellulose-fibre/elastomer mixture.

Similarly, whenever this process uses, as agent acting as an interface between the cellulose fibres (and optionally the synthetic fibres) and the elastomer, a polymer whose crosslinking requires the presence of a specific crosslinking system—which is, for example, the case with polyvinyl alcohols—it includes the addition of such a crosslinking system, which, here again, may include not only a crosslinking agent proper but also crosslinking promoters and accelerators.

Moreover, whatever the method of implementing the process according to the invention, it also cludes cutting the spongy material obtained to the sizes and shapes (blocks, slabs, sheets, etc.) suitable for the uses for which it is intended.

The subject of the present invention is also sponges characterized in that they comprise a spongy material as defined above.

These sponges, which may be intended both for toilet surfaces and for cleaning surfaces, preferably have a thickness of between 1 and 15 cm, particularly preferably between 1.5 and 10 cm and even more preferably between 2 and 5 cm, in order to make them easier to handle.

Furthermore, the subject of the present invention is household articles, comprising a spongy element, such as sponge cloths, squeezy mops and squeegees for cleaning surfaces (floors, walls, mirrors, windowpanes, etc.), characterized in that the said spongy element comprises a spongy material as defined above.

The present invention will be more clearly understood with the aid of the rest of the description which follows and which refers to illustrative embodiments of spongy materials according to the invention and to demonstration of their properties.

However, it goes without saying that these examples are given solely by way of illustrating the subject of the invention and they in no way constitute any limitation.

EXAMPLE 1

PREPARATION OF A SPONGY MATERIAL FROM A LATEX AND CELLULOSE FIBRES

A pulp of long cellulose fibres is prepared in a turbodisperser (from Lödige) by gradually dispersing, with vigorous stirring (1200–1500 rpm), 235 g of sheets of cotton linter, which are cut up beforehand into shreds a few cm in size, in 2.255 kg of water and by maintaining the stirring for approximately 10 minutes.

Poured onto the fibre pulp thus prepared are 141 g of a 10% aqueous $CaCl_2$ solution (intended to promote coagulation of the latex) and the compound is mixed for 1 minute at 1200–1500 rpm. Into the compound are then incorporated, with gentle stirring (300 rpm), 559 g of a carboxylated butadiene-acrylonitrile rubber latex having a dry rubber content of 42% containing a vulcanization system formed by 1 part of zinc oxide, 1 part of sulphur and 1 part of zinc dibutyldithiocarbamate (a crosslinking accelerator and sulphur donor) per 100 parts of dry rubber followed by 1.359 kg of spherical pieces of ice (granulated ice) having a distribution of diameters ranging uniformly between 0.1 and 10 mm.

The resulting mixture is poured into a mould so as to obtain, in the mould, a mixture depth of approximately 10 cm and the mould is placed in a freezer at a temperature of −30° C. for a minimum of 3 hours.

After this period of freezing and after demoulding, the frozen block thus obtained is enclosed in a metal supporting gauze and placed for 30 minutes in a live-steam autoclave having a temperature of 140° C. so as to melt the pieces of ice that it contains, to remove the water resulting from this melting and to crosslink the latex, and then placed for 3 hours 30 minutes in a forced-air oven having a temperature of 130° C. in order to dry it. The resulting spongy material can then be cut to the desired dimensions.

EXAMPLE 2

PREPARATION OF A SPONGY MATERIAL FROM A LATEX AND A MIXTURE OF CELLULOSE FIBRES

A pulp of long cellulose fibres is prepared in a turbodispenser by gradually dispersing, with gentle stirring (300–350 rpm), 117 g of sheets of cotton linter, cut up beforehand into shreds a few cm in size, in 1.127 kg of water. After all the sheet shreds have been introduced into the water, the stirring is increased to 900 rpm and maintained for 5 to 10 minutes.

Meanwhile, in a planetary mixer a pulp of short cellulose fibres is prepared by dispersing, with gentle stirring (300 rpm), 117 g of ARBOCELL® PWC 500 fibres (from Rettenmaier & Söhne) in 1.127 kg of water and by continuing to stir until a homogeneous pulp is obtained.

Next, while still stirring gently, the long-fibre pulp is introduced into the short-fibre pulp thus obtained and the stirring is continued for a few minutes so as to obtain a homogeneous mixture.

Added to 2.490 kg of this mixture in the vessel of a planetary mixer, with gentle stirring, are, in succession:

- 141 g of a 10% aqueous $CaCl_2$ solution;
- 559 g of PERBUNAN® N VT latex (a carboxylated butadiene-acrylonitrile rubber latex sold by Bayer and having a dry rubber content of 42%);
- 9.4 g of sulphur, 4.7 g of zinc diethyldithiocarbamate (ZDEC, a crosslinking accelerator and sulphur donor) and 4.7 g of zinc mercaptobenzothioazole (ZMBT, a crosslinking accelerator and sulphur donor); and
- 2 kg of spherical pieces of ice having a distribution of diameters ranging uniformly between 0.1 and 10 mm.

The mixture thus obtained is immediately poured into a mould so as to obtain, in this mould, a mixture depth of approximately 10 cm and the mould is placed in a freezer under the same conditions as described in Example 1.

After this period of freezing and after demoulding, the frozen block is enclosed in a metal supporting gauze and placed for 30 minutes in a live-steam autoclave having a temperature of 140° C. and then for 3 hours 30 minutes in a forced-air oven having a temperature of 120° C., as described in Example 1.

EXAMPLE 3

PREPARATION OF A SPONGY MATERIAL FROM A LATEX AND A MIXTURE OF CELLULOSE FIBRES AND OF POLYAMIDE FIBRES

After having cut the sheets of cotton linter into shreds having a length of between approximately 8 mm and 1 cm by means of a granulator, 141.7 g of the shreds thus obtained, 12.3 g of polyamide fibres (from Le Flockage) and 1.386 kg of water are introduced into a turbodisperser and the compound is stirred at 850 rpm for 3 minutes. Thus, 1.540 kg of a fibre pulp comprising a mixture of cellulose fibres and polyamide fibres is obtained, in which mixture the latter fibres represent 8% by mass of the total mass of the fibres.

Moreover, added to 560 g of CHEMIGUM® 248 latex (a butadiene-acrylonitrile rubber latex sold by Goodyear and having a dry rubber content of 55%) in a vessel fitted with a magnetic stirrer (index 6 of the magnetic stirrer) are, in succession:

- 12.3 g of AEROSOL® 22 (a surfactant from Cytec); and
- 49.2 g of a crosslinking system prepared beforehand by dispersing, in an agitator (from Rayneri) fitted with a deflocculating blade and with vigorous stirring, 100 g of sulphur, 50 g of ZDEC and 50 g of ZMBT in 200 ml of a solution containing 5% methylenebis-(naphthalene-sodium) (a dispersing agent available from BASF under the reference TAMOL®;

and the stirring is continued for several minutes in order to obtain a homogeneous mixture.

184.8 g of a 10% $CaCl_2$ solution and 3.08 g of CELACOL® (hydroxypropylmethylcellulose sold by Courtaulds Chemicals) are added in succession in a turbodisperser, with gentle stirring, to the fibre pulp obtained previously and then the latex is incorporated into the resulting mixture and the compound is stirred at 800 rpm for 5 minutes so as to cause a foam to form. This foam is then expelled from the turbodisperser by increasing the stirring to 1000 rpm, and collected in a beaker in order to pour it straightaway into a mould which is filled to a depth of approximately 6 cm. After smoothing off the surface of the foam in order to obtain a uniform mould-filling depth, the mould is immediately placed in a freezer at a temperature of −20° C. and kept at this temperature for a minimum of 3 hours.

After this period of freezing and after demoulding, the frozen block is placed in a forced-air oven set at a temperature of 120° C. and kept in this oven for approximately 3 hours so as to dry it (this drying being followed by a change in the mass of the block) and to crosslink the latex. After removing the crust, the spongy material thus obtained can be cut to the desired dimensions.

EXAMPLE 4

PREPARATION OF A SPONGY MATERIAL FROM A LATEX, SILICA AND A MIXTURE OF CELLULOSE FIBRES AND POLYAMIDE FIBRES

A spongy material according to the invention is obtained by following an operating protocol similar to that described in Example 3 above, apart from the following differences:

the crosslinking system is prepared by dispersing 75 g of sulphur, 25 g of ZDEC, 25 g of ZMBT and 125 g of zinc oxide in 200 ml of a 5% TAMOL® aqueous solution;

before it is introduced into the latex, this crosslinking system is mixed with 250 g of ULTRASIL® VN3 (a silica sold by Rhone-Poulenc) and the compound is ground in a ball mill so as to obtain perfect homogenization and, finally;

the foam formed by stirring the fibre/latex mixture (including the crosslinking system and the silica) in the turbodisperser is expelled while continuing to stir this mixture at a speed of 800 rpm (and not at 1000 rpm as in Example 3).

EXAMPLE 5

PREPARATION OF A SPONGY MATERIAL FROM A LATEX, POLYVINYL ALCOHOL AND A MIXTURE OF CELLULOSE FIBRES AND POLYAMIDE FIBRES

A spongy material according to the invention is obtained by carrying out a similar operating protocol to that described in Example 3, apart from the following differences:

the fibres (that is to say the 141.7 g of cotton linter shreds and the 12.3 g of polyamide fibres) are dispersed in 1.185 kg of water so as to obtain 1.338 kg of fibre pulp;

incorporated into this pulp, in addition to the $CaCl_2$ solution, the CELACOL® and the latex, are 205 g of an aqueous solution containing 30.8 g of GOHSENOL® (polyvinyl alcohol sold by Nippon Goshei) and then 1.2 g of RESIMEN® s 3521 (a melamine-formaldehyde resin sold by Monsanto and serving here as a crosslinking agent for the polyvinyl alcohol) and, finally, 06g of CYCAT 600 (a sulphonic acid sold by Cytec and serving as crosslinking accelerator for the polyvinyl alcohol); and the final mixture (fibres+latex+crosslinking system+polyvinyl alcohol+additives) is stirred at 850 rpm for 5 minutes so as to form a foam, and this foam is expelled from the turbodisperser by increasing the rate at which this mixture is stirred to 950 rpm.

EXAMPLE 6

PREPARATION OF A SPONGY MATERIAL FROM A LATEX, A VINYL ADHESIVE AND A MIXTURE OF CELLULOSE FIBRES AND POLYAMIDE FIBRES

A spongy material according to the invention is also obtained by following an operating protocol similar to that described in Example 5, but by replacing the polyvinyl alcohol and its crosslinking system with 30 g of a vinyl adhesive (from Sader).

EXAMPLE 7

PREPARATION OF A SPONGY MATERIAL FROM A LATEX, CALCIUM CARBONATE AND CELLULOSE FIBRES

A cellulose-fibre pulp is prepared in a turbodisperser by dispersing 209.8 g of cotton linter sheets, cut up beforehand into shreds approximately 8 mm to 1 cm in length, in 1.615 kg of water and stirring the compound at 850 rpm for 3 minutes. This mixture is then filtered, to remove 361 g of water from it, so as to obtain 1.464 kg of a pulp having a cellulose-fibre content of 14.3% (m/m).

Moreover, added to 636 g of CHEMIGUM® 6271 latex (a butadiene-acrylonitrile rubber latex sold by Goodyear and having a dry rubber content of 46%) in a vessel fitted with a magnetic stirrer (index 6 of the magnetic stirrer) are, in succession:

58.6 g of a crosslinking system prepared beforehand by dispersing, in an agitator (from Rayneri) fitted with a defloculating blade and vigorously stirred, 47 g of sulphur, 35 g of ZDEC and 117.5 g of zinc oxide in 200 ml of a solution containing 5% TAMOL®;

49.2 g of a 60% aqueous solution of $CaCO_3$ (HYDROCARB® from OMYA); and 12.3 g of a 5% aqueous solution of HANSA® coagulant 4710 (an organosiloxane sold by Goldschmitt Group), and the stirring is continued for several minutes in order to obtain a homogeneous mixture.

2.9 g of CELACOL® and then the latex are added in a turbodisperser to the fibre pulp obtained previously and the compound is stirred at 850 rpm for 5 minutes in order to obtain a foam. This foam is then expelled from the turbodisperser by continuing to stir at 850 rpm and collected in a beaker in order to pour it straight away into a mould which is filled to a depth of approximately 6 cm.

After smoothing off the surface of the foam in order to obtain a uniform mould-filling depth, the mould is immediately placed in a forced-air oven at a temperature of 120° C. and kept in this oven for approximately 6 hours so as to coagulate the foam as well as to dry the product resulting from this coagulation and to crosslink the latex. After removing the crust, the spongy material thus obtained may be cut to the desired dimensions.

PROPERTIES OF THE SPONGY MATERIALS ACCORDING TO THE INVENTION

The properties of the spongy materials according to the invention were evaluated by determining:

their relative density;

their water absorption capacity;

their water retention capacity after manual wringing;

their tensile strength; and their wipeability.

The relative density was determined by taking the ratio (d) of the density of the spongy materials to the density of water.

The water absorption capacity was determined by weighing the spongy materials when they are perfectly dry and after immersion in a volume of water, and then taking the ratio (A) according to the formula:

$$A = \frac{\text{mass after immersion in water} - \text{dry mass}}{\text{dry mass}} \times 100$$

while the water retention capacity after manual wringing was determined by weighing these same spongy materials after vigorous manual wringing and taking the ratio (R) according to the formula:

$$R = \frac{\text{mass after immersion in water} - \text{mass after manual wringing}}{\text{dry mass}} \times 100$$

As regards the tensile strength, this was determined by pulling test pieces, measuring between 5 and 6 cm in length, between 2.5 and 3.5 cm in width and between 1.5 and 2.5 cm in thickness and prepared by cutting the spongy materials to be tested, by means of an electronic tensile tester set at 300 mm/min. until they broke.

Finally, the wipeability was assessed by the presence or absence of traces of water on a prewetted surface after wiping this surface with the said spongy materials.

By way of examples, the results obtained on spongy materials prepared according to Examples 1, 2, 3, 4 and 5—and called hereafter Material 1, Material 2, Material 3, Material 4 and Material 5—are given in Table 1 below.

TABLE 1

| | d | A (%) | R (%) | C (MPa) | Wipeability |
|---|---|---|---|---|---|
| Material 1 | 0.05 | 1000 | ND | ND | No trace of water |
| Material 2 | 0.1 | 900 | ND | ND | No trace of water |
| Material 3 | 0.07 | 1100 | 78 | 0.15 | No trace of water |
| Material 4 | 0.07 | 1000 | 85 | 0.13 | No trace of water |
| Material 5 | 0.06 | 1150 | 82 | 0.12–0.15 | No trace of water |

ND: Not determined.

The invention is in no way limited to the embodiments that have just been explicitly described; on the contrary, it encompasses all the variants that might occur to a person skilled in the art, without departing either from the context or the scope of the present invention.

What is claimed is:

1. A sponge comprising a mixture containing: cellulose fibers; at least elastomer; at least one polymer serving as an interface agent between said cellulose fibers and said elastomer, said at least one polymer being polyvinyl alcohol; and at least one thickening agent selected from the group consisting of cellulose ethers and cellulose esters.

2. A material according to claim 1, wherein said cellulose fibers are cellulose fibers which have been subjected beforehand to fibrillation.

3. A sponge according to claim 1, wherein the elastomer is selected from the group consisting of polybutadiene rubbers, butadiene-styrene copolymers, butadiene-acrylonitrile copolymers, polychloroprenes, and mixtures thereof.

4. A sponge according to claim 1, wherein the mixture additionally comprises synthetic fibers selected from the group consisting of polyamide fibers, polyester fibers, polyethylene fibers, polypropylene fibers, polyacrylonitrile fibers, polyvinyl alcohol fibers, and mixtures thereof.

5. A sponge according to claim 4, wherein said synthetic fibers represent at most 20% by mass of the total mass of the fibers present in said sponge.

6. A sponge according to claim 1, wherein the mixture additionally comprises one or more additives selected from the group consisting of light-colored fillers, plasticizers, dyes or pigments, antioxidants, UV stabilizers, antiozonants, fungicides, bactericides, microencapsulated fragrances, surfactants, latex coagulants, and crosslinking agents.

7. A sponge according to claim 1, wherein the ratio of the total mass of the fibers to the mass of elastomer present in the sponge is between 2 and 0.2.

8. A sponge according to claim 1 having a relative density of between 0.03 and 0.08 and a water absorption capacity of between 900 and 1200%.

9. A sponge according to claim 1 having a tensile strength of at least 0.1 MPa.

10. A process for manufacturing a sponge comprising:

(a) preparing a mixture containing cellulose fibers, at least one crosslinkable elastomer in the form of a latex, at least one polymer serving as an interface agent between said cellulose fibers and said elastomer and said at least one polymer being polyvinyl alcohol, at least one thickening agent selected from the group consisting of cellulose ethers and cellulose esters, and a suitable chosen crosslinking system;

(b) foaming the fixture resulting from step (a);

(c) forming the foam resulting from step (b) by coagulation; and (d) drying and crosslinking the coagulated product resulting from step (c) by heating.

11. A process according to claim 10, wherein the mixture resulting from step (a) is foamed by mechanical stirring.

12. A process according to claim 10 wherein the foam is coagulated by freezing.

13. A process according to claim 12, wherein the foam is frozen by cooling this foam to a temperature of between −10 and −30° C.

14. A process according to claim 10 wherein the foam is coagulated by thermally sensitizing the latex that it contains.

15. A process according to claim 12, including adding, during step (a), a coagulant capable of reacting under the effect of an increase in the temperature and coagulating the foam during step (c) by taking it to a temperature of at least 25° C.

16. A process according to claim 10, wherein the coagulated product resulting from step (c) is heated, during step (d) at a temperature of between 100 and 200° C.

17. A process according to claim 10, including adding during step (a) a surfactant.

18. A sponge according to claim 1, wherein the thickening agent is hydroxypropylmethylcellulose.

19. Household articles comprising a spongy element formed from a spongy material according to claim 1.

* * * * *

UNITED STATES PATENT AND TRADEMARK OFFICE
CERTIFICATE OF CORRECTION

PATENT NO.    : 6,346,557 B1
DATED         : February 12, 2002
INVENTOR(S)   : Argy et al.

It is certified that error appears in the above-identified patent and that said Letters Patent is hereby corrected as shown below:

Column 15,
Line 39, before "elastomer" insert -- one --.

Column 16,
Line 43, "claim 12" should read -- claim 14 --.

Signed and Sealed this

Tenth Day of September, 2002

Attest:

JAMES E. ROGAN
Attesting Officer          Director of the United States Patent and Trademark Office